(12) United States Patent
Sams et al.

(10) Patent No.: US 6,699,134 B2
(45) Date of Patent: Mar. 2, 2004

(54) ANTI-SHUDDER TRIPOD TYPE CV UNIVERSAL JOINT

(75) Inventors: Robert Sams, Clinton Township, MI (US); Michael W. Hopson, Clinton Township, MI (US); Holm Schmitt, Cologne (DE); Robert F. Keller, Chesterfield, MI (US); Bradley W. Doner, Dearborn, MI (US); Alexander Haertel, Cologne (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/790,444

(22) Filed: Feb. 21, 2001

(65) Prior Publication Data

US 2002/0115491 A1 Aug. 22, 2002

(51) Int. Cl.[7] ............................................. F16D 3/205
(52) U.S. Cl. ........................................ 464/111; 464/905
(58) Field of Search .......................... 464/111, 120–124, 464/129, 132, 905, 7, 11, 12, 15; 384/155, 213, 214

(56) References Cited

U.S. PATENT DOCUMENTS

| | | | |
|---|---|---|---|
| 4,192,154 A | 3/1980 | Nakamura et al. | |
| 4,224,806 A | 9/1980 | Kobayashi | |
| 4,318,282 A | 3/1982 | Orain | |
| 4,472,156 A | 9/1984 | Orain | |
| 4,501,571 A | 2/1985 | Orain | |
| 4,571,214 A | 2/1986 | Orain | |
| 4,589,856 A | 5/1986 | Mazziotti et al. | |
| 4,693,698 A | 9/1987 | Olson, II | |
| 4,708,693 A | 11/1987 | Orain | |
| 4,741,723 A | 5/1988 | Orain | |
| 4,747,803 A | 5/1988 | Kimata et al. | |
| 4,773,890 A | 9/1988 | Iwasaki et al. | |
| 4,786,270 A | 11/1988 | Iwasaki | |
| 4,797,798 A | 1/1989 | Schumaker et al. | |
| 4,828,534 A | 5/1989 | Orain | |
| 4,854,917 A | 8/1989 | Mizukoshi | |
| 4,886,479 A | 12/1989 | Richtmeyer et al. | |
| 4,891,035 A | 1/1990 | Sasaki et al. | |
| 4,954,119 A | 9/1990 | Sasaki et al. | |

(List continued on next page.)

FOREIGN PATENT DOCUMENTS

| | | | | |
|---|---|---|---|---|
| DE | 198 34 142 | | 2/2000 | |
| FR | 2 732 735 | | 4/1995 | |
| FR | 2 752 890 | | 8/1996 | |
| GB | 779419 | * | 7/1957 | ................. 384/213 |
| GB | 2226102 A | | 6/1990 | |
| GB | 2 226 102 A | * | 6/1990 | ................. 464/111 |
| JP | 53-76253 | * | 7/1978 | ................. 464/15 |
| JP | 59-40016 | | 8/1982 | |
| WO | WO 98/09089 A1 | | 3/1998 | |

OTHER PUBLICATIONS

Machinery's Handbook, 25th ed. New York International Press, 1996–A pp. 70–73. TJ151.M3 1996.*

*Primary Examiner*—Greg Binda
(74) *Attorney, Agent, or Firm*—John E. Kajander

(57) ABSTRACT

An anti-shudder constant velocity universal joint of the tripod type is provided having an outer joint member including three circumferentially distributed, axially extending longitudinal tracks formed therein, and an inner joint member having three circumferentially distributed radial journals arranged to engage the longitudinal tracks when the joint is assembled. The end of each journal is mated with and supports rotation of a roller bearing assembly, while rotating and pivoting within the roller bearing assembly upon articulation of the joint. This reduces the frictional forces on the roller bearings created by maintaining the roller bearings in a relatively proper/parallel orientation within the tracks by allowing the journal ends to freely rotate and pivot therein. A spherical-to-spherical contact surface is provided between the journal ends and an inner ring of the respective roller bearing assemblies to lower Hertzian stresses by distributing forces over a larger region of contact.

11 Claims, 7 Drawing Sheets

U.S. PATENT DOCUMENTS

| | | | |
|---|---|---|---|
| 4,955,847 A | * | 9/1990 | Orain .................... 464/111 |
| 5,019,016 A | | 5/1991 | Uchman |
| 5,069,653 A | | 12/1991 | Mizukoshi |
| 5,098,342 A | | 3/1992 | Mizukoshi |
| 5,137,496 A | | 8/1992 | Sasaki et al. |
| 5,171,185 A | | 12/1992 | Schneider |
| 5,199,925 A | | 4/1993 | Welschof |
| 5,203,741 A | | 4/1993 | Turner et al. |
| 5,209,700 A | | 5/1993 | Bensinger et al. |
| 5,213,546 A | | 5/1993 | Schneider |
| 5,224,899 A | | 7/1993 | Turner et al. |
| 5,330,389 A | | 7/1994 | Jost et al. |
| 5,362,275 A | | 11/1994 | Girguis |
| 5,376,049 A | | 12/1994 | Welschof et al. |
| 5,380,249 A | | 1/1995 | Krude |
| 5,395,289 A | | 3/1995 | Damian |
| 5,397,271 A | | 3/1995 | Poulin |
| 5,411,440 A | | 5/1995 | Bensinger et al. |
| 5,474,500 A | | 12/1995 | Girguis |
| 5,507,693 A | | 4/1996 | Schwarzler et al. |
| 5,525,109 A | | 6/1996 | Hofmann et al. |
| 5,538,473 A | | 7/1996 | Busch et al. |
| 5,571,047 A | | 11/1996 | Stall et al. |
| 5,573,464 A | | 11/1996 | Hofmann et al. |
| 5,591,085 A | | 1/1997 | Stall et al. |
| 5,788,577 A | | 8/1998 | Kadota et al. |
| 5,935,009 A | * | 8/1999 | Hosdez et al. ............. 464/111 |
| 5,989,124 A | | 11/1999 | Goto et al. |
| 6,200,224 B1 | * | 3/2001 | Sugiyama et al. .......... 464/111 |
| 6,398,415 B1 | * | 6/2002 | Ibe et al. ................ 384/214 |
| 2002/0045486 A1 | * | 4/2002 | Kudo et al. ............... 464/111 |

\* cited by examiner

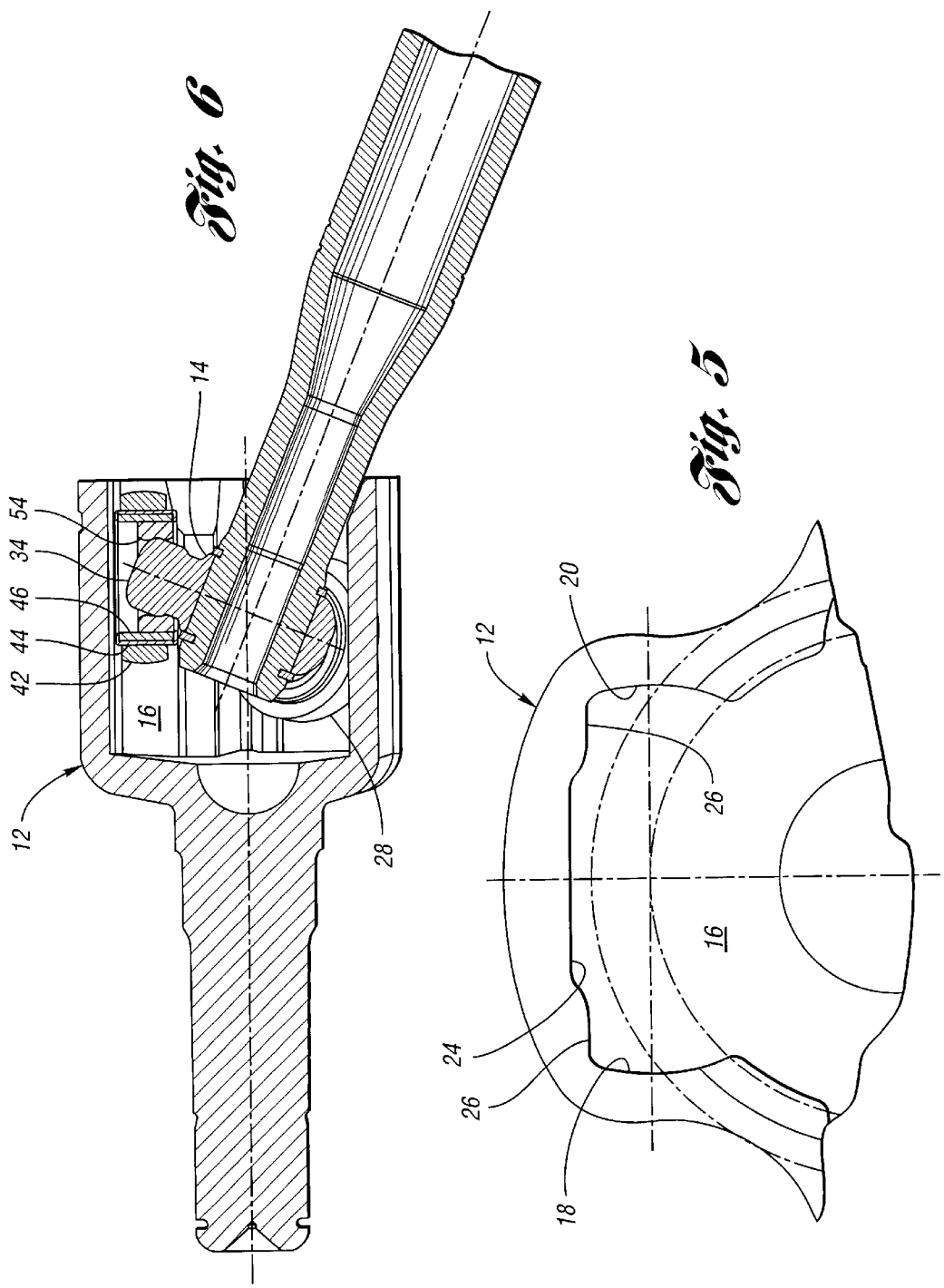

ANTI-SHUDDER TRIPOD TYPE CV UNIVERSAL JOINT

BACKGROUND OF THE INVENTION

1. Field of the Invention

The present invention generally relates to a constant velocity universal joint of the tripod type, and more particularly to low friction type tripod joints.

2. Background Art

Generally, conventional tripod-type constant velocity (CV) universal joints utilize an outer drive member formed with three arc-shaped track grooves extending axially at equally spaced circumferential positions, and an inner part having three trunnions extending radially so as to correspond to the track grooves of the outer drive member. A roller element is rotatably mounted on each trunnion. Each roller element is received in a track groove so as to produce a rolling motion in the axial direction so that a rotary force is transmitted between shafts connected to the inner and outer drive members.

However, conventional tripod type CV joints generally experience difficulty when the shafts are articulated with respect to each other, i.e., form a working angle. In this situation, the roller elements become inclined with respect to the track groove thereby causing relative sliding between the roller element and track groove without continuous rolling motion. As a result, a large frictional resistance acts on the trunnion and the roller element.

In one known CV joint arrangement disclosed in JP 59-40016, the trunnions are formed with an outer spherical receiving surface and a roller assembly formed from a freely oscillating cylindrical guide ring mounted about the trunnion, an outer ring which engages the inside of a groove in the outer drive member, and a plurality of rolling bodies are disposed between the outer and guide rings.

A similar CV joint arrangement is disclosed in U.S. Pat. No. 5,411,440 to Bensinger et al. More, specifically, according to the '440 patent, a CV universal joint of the tripod type is provided having an outer joint part formed with three circumferentially distributed, axially extending longitudinal recesses, and an inner joint part formed with three circumferentially distributed radial journals engaging the longitudinal recesses. The journals are provided with roller members which are held substantially isogonally in the longitudinal recesses and which are held relative to the journals so as to be radially displaceable and angularly movable. Each roller member is rotatably supported on a roller carrier having a cylindrical inner surface. The journals have spherical pivot heads which engage the radial cylindrical inner surface of a roller carrier so as to be radially movable and angularly movable at right angles thereto around two axes.

With both arrangements, the spherical surface of the journal heads pivot relative to the inner cylindrical surface of the roller member to maintain the roller member parallel to the groove of the outer drive member even if the joint is articulated, thereby reducing frictional resistance. However, the contour of the spherical journal head and inner cylindrical ring only allows contact at a limited surface region. This in turn causes concentration of Hertzian forces at a small contact region, and increases the potential for higher friction and shuddering of the joint during operation.

Therefore, a need exists for a CV joint of the tripod type which can maintain the roller assemblies in a parallel orientation relative to the outer part grooves and overcome the deficiencies in known arrangements.

SUMMARY OF THE INVENTION

Therefore, it is an object of the present invention to provide an anti-shudder CV joint of the tripod type having a journal head that pivots and rotates within a roller member, where the contact surface between a journal and roller member is arranged to distribute the contact force across a larger contact surface area.

In accordance with this and other objects, the present invention provides a constant velocity universal joint of a tripod type including an outer joint member having three circumferentially distributed, axially extending longitudinal tracks formed therein, and an inner joint member having three circumferentially distributed radial journals arranged to engage the longitudinal tracks. Each journal is provided with an outer spherical end surface. A roller member is mounted about the outer end surface of each journal and arranged to contact opposing inner surfaces of a track, wherein each roller member includes an inner ring having a spherical inner surface arranged to nest about the outer spherical end surface of a journal so as to allow the journal to pivot therein and maintain the roller member in a parallel orientation relative to the track upon articulation of the joint.

In accordance with one embodiment of the present invention, the opposing sides of the longitudinal tracks are concave, and each roller member includes a rotatable outer ring having a spherical outer surface in a region of contact with the opposing sides of a track. In another embodiment, the opposing sides of the longitudinal tracks are shaped as a Gothic arch, and each roller member includes a rotatable outer ring having an outer surface in the shape of a truncated ellipse or prolate spheroid in a region of contact with the opposing sides of a track.

In accordance with one aspect of the present invention, the inner ring of the roller member is moveable to allow the inner ring to stay properly positioned relative to the journal as the journal pivots therein.

Thus, the present invention provides an anti-shudder constant velocity universal joint of the tripod type having an outer joint member including three circumferentially distributed, axially extending longitudinal recesses or tracks formed therein, and an inner joint member having three circumferentially distributed radial journals arranged to engage the longitudinal tracks when the joint is assembled. The outer and inner members are connected to respective shafts. The end of each journal is mated with and supports rotation of a roller bearing assembly. The journals hold the roller bearing assemblies in a respective longitudinal track relative to the journal. The CV joint of the present invention is particularly suited for use with articulated joints, i.e., a joint in which the shafts connected to the outer and inner joint members form an angle with respect to each other when the joint is assembled. Large frictional forces on the roller bearings created by such an articulated joint are prevented because the joint is able to maintain the roller bearings in a relatively proper/parallel orientation within the longitudinal tracks by allowing the journal ends to freely rotate and pivot within an inner ring of the roller bearing assembly. A spherical-to-spherical contact surface is provided between the journal ends and respective roller bearing assemblies to lower Hertzian stresses by distributing forces over a larger region of contact.

The above features and advantages of the present invention are readily apparent from the following detailed

BRIEF DESCRIPTION OF THE DRAWINGS

FIG. 5 is a partial cross-section of the outer joint member showing the shape of a track in accordance with the first embodiment;

FIG. 6 is a longitudinal cross-section showing articulation of the joint and pivoting of the inner part within the roller bearing assembly;

DETAILED DESCRIPTION OF THE PREFERRED EMBODIMENT(S)

Figure 1:
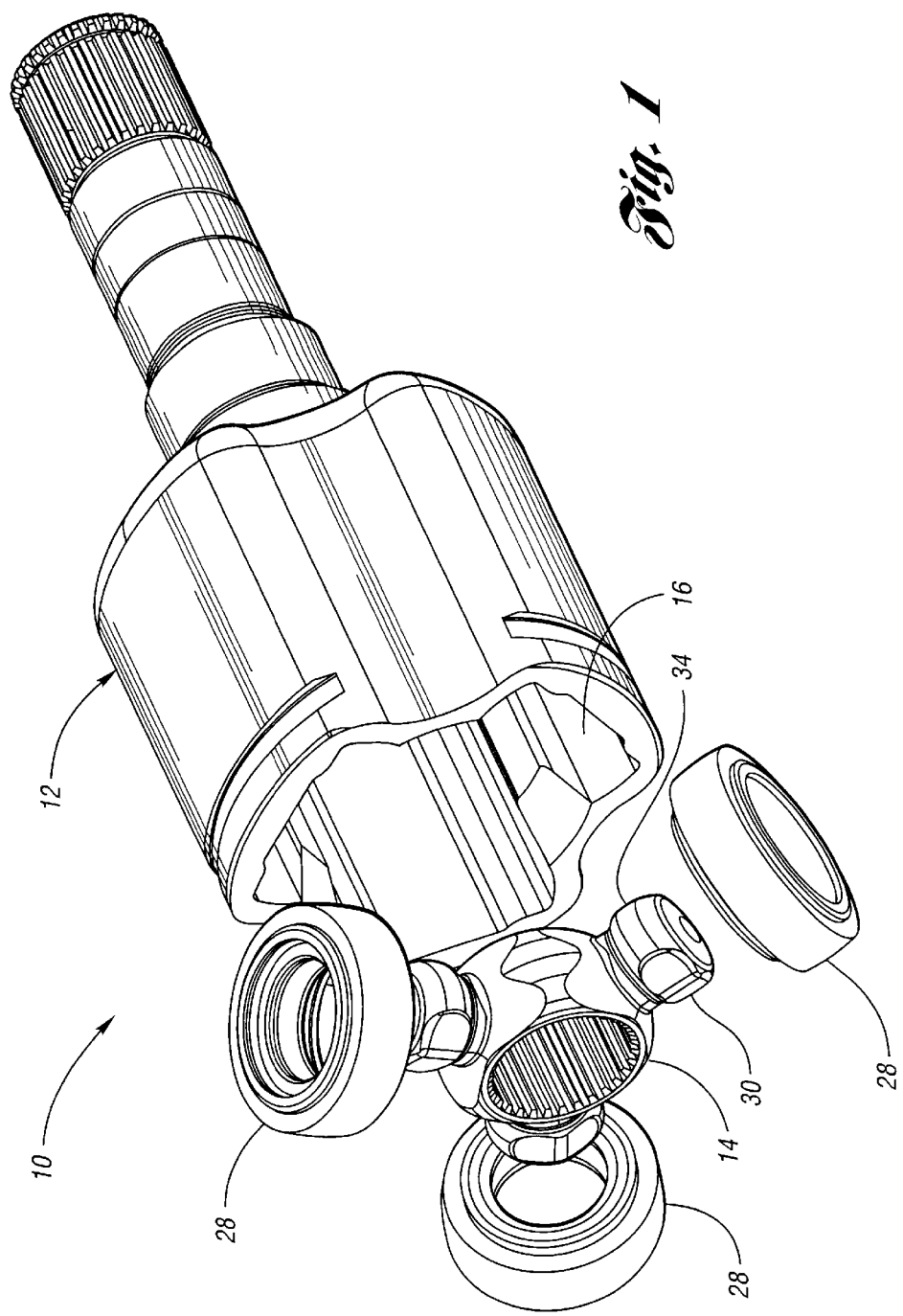
FIG. 1 is an exploded perspective view of a constant velocity universal joint of the tripod type in accordance with a first embodiment of the present invention.
Figure 2:
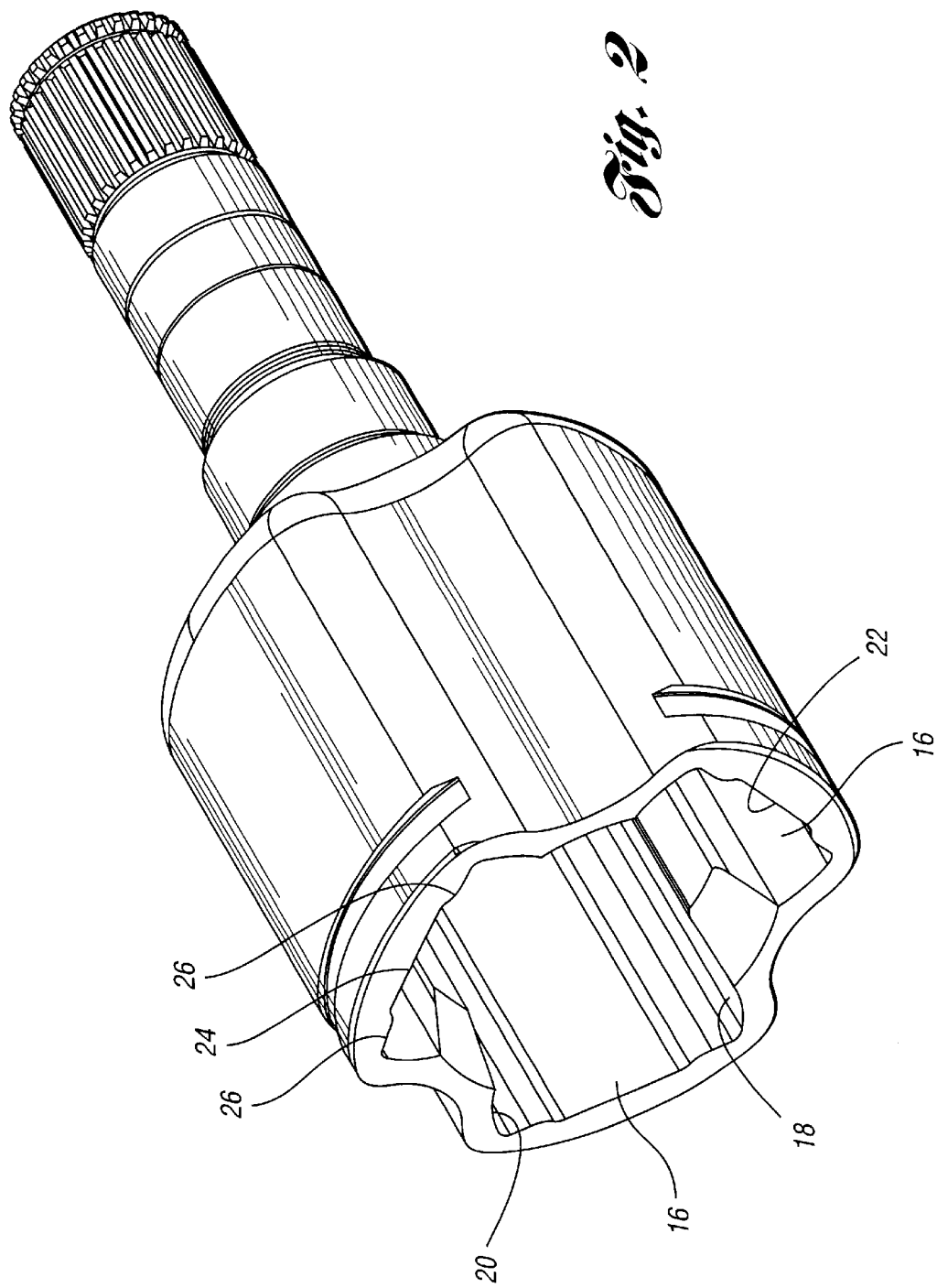
FIG. 2 is a perspective view of an outer joint member.

A first embodiment of a CV joint in accordance with the present invention will be described in connection with FIGS. 1–9. More specifically, FIG. 1 shows an exploded perspective view of tripod type CV joint 10 having an outer tripod joint part 12, and an inner spider joint part 14. The outer joint part 12 is shown in isolation in FIG. 2, while the inner spider 14 is shown in isolation in FIGS. 3 and 4. A set of three longitudinal (axially extending) tracks or races 16 are circumferentially formed within the cavity of the outer joint part 12. A partial cross-section of outer joint 12 extending longitudinally along the part is shown FIG. 5. As best seen in FIG. 5, each track includes opposing inner faces 18 and 20, and an outer end face 22. In this embodiment, inner faces 18 and 20 are formed having a spherical or concave contour. Outer end face 22 is formed to include a raised middle portion 24. The raising of the middle portion of the outer end face advantageously creates shoulder surfaces 26 that support the top surface of a roller bearing assembly 28 and limit displacement of the roller bearing assembly within the track. In addition, raised middle portion 22 provides a grease channel for optimum distribution of grease to the tracks and support surfaces to lower roller contact friction, thus lowering the joint plunge effort.

Figure 3:
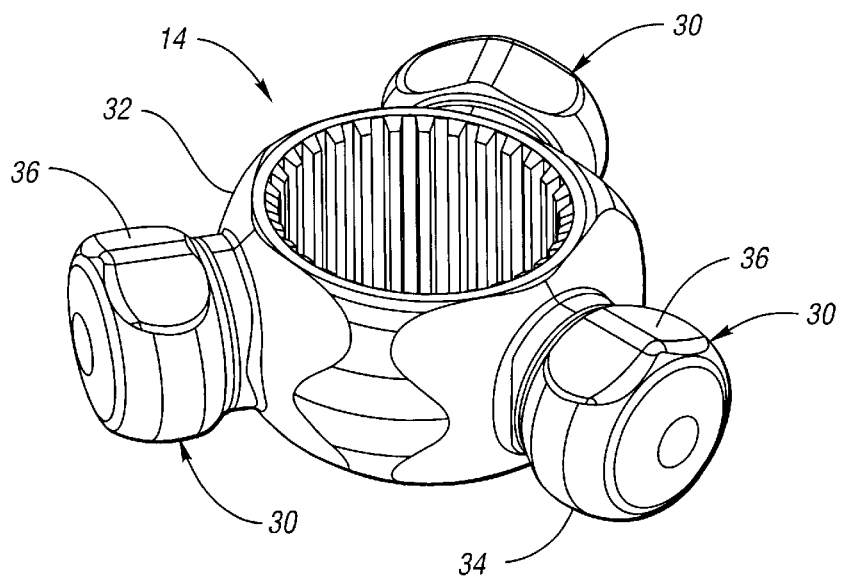
FIG. 3 is a perspective view of an inner joint member (spider)
Figure 4:
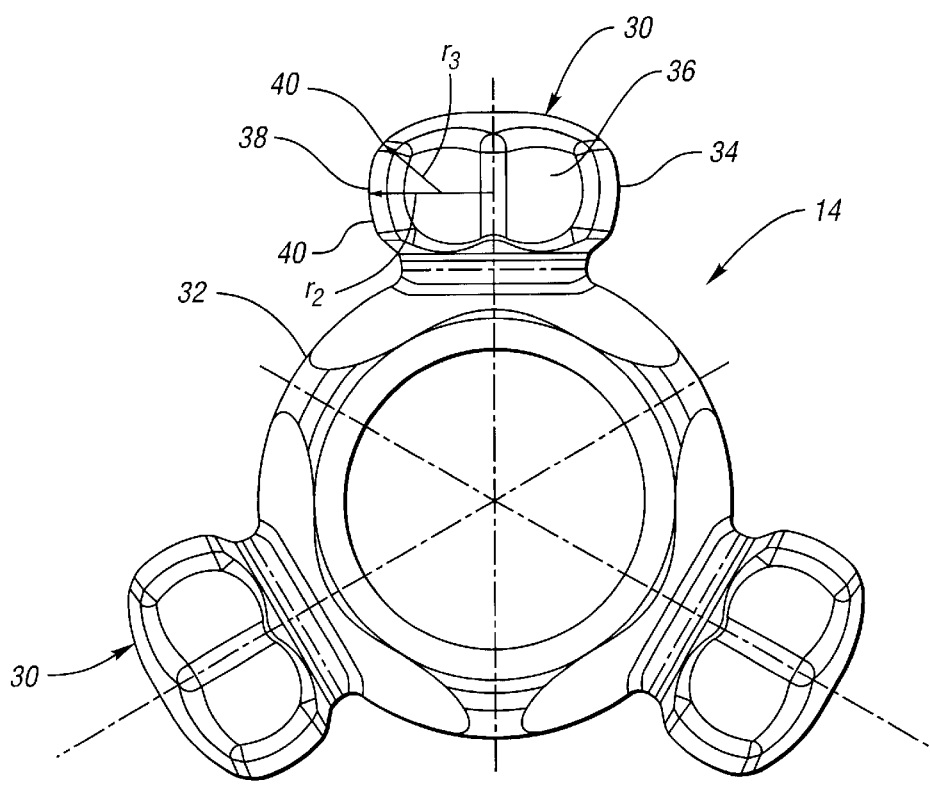
FIG. 4 is axial view of the inner joint member.

As seen in FIGS. 3 and 4, inner spider 14 includes three journals 30 that are circumferentially spaced 120° about a spider body 32. In a preferred embodiment, each journal 30 is provided with a partially spherical shaped roller bearing support surface 34 (trunnion) on its free end. As described below, trunnions 34 are arranged to fit within an inner ring of a roller bearing upon assembly 28. A set of truncated or flattened surface portions 36, for example, two adjacent, angularly aligned surfaces on each axial face as shown in FIGS. 3 and 4, are formed in opposing regions of the outer trunnion diameter so as to provide a grease channel for better lubrication as well as to facilitate fitting of the roller bearing inner ring about the trunnion during assembly.

The outer shape of the trunnion 34 is formed by a spherical center region 38 of radius r2, and upper and lower curved regions 40 extending up to the top and down to the neck of the journal at a smaller radius r3. As illustrated in FIG. 6, as the joint is articulated, for example up to 22°, the outer surface of trunnions 34 allow the spider to rotate or pivot relative to an inner ring of the bearing assembly while the bearing assembly 28 remains in a proper parallel orientation relative to the side walls of the tripod tracks.

Figure 7:
FIG. 7 is a perspective of a roller bearing assembly.
Figure 8:
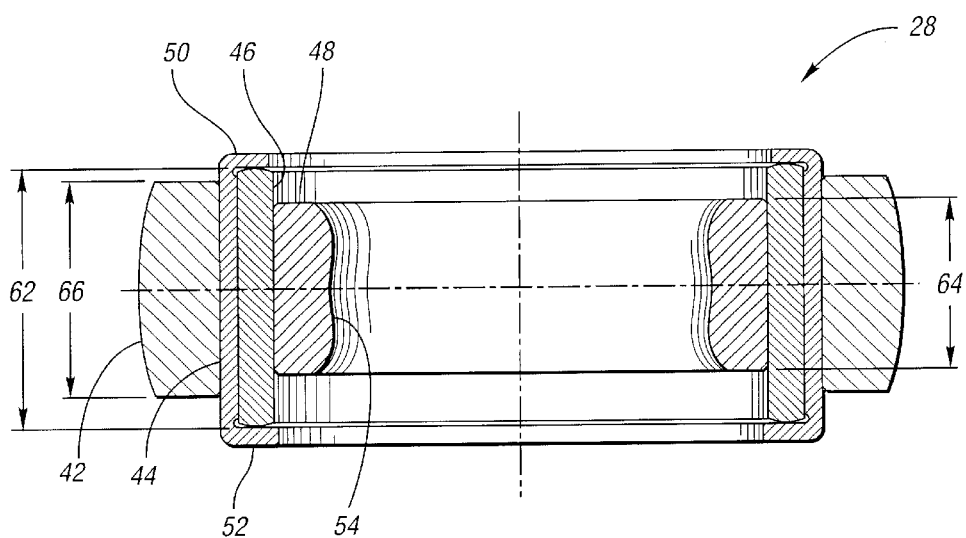
FIG. 8 is a cross-section of the roller bearing assembly.
Figure 9:
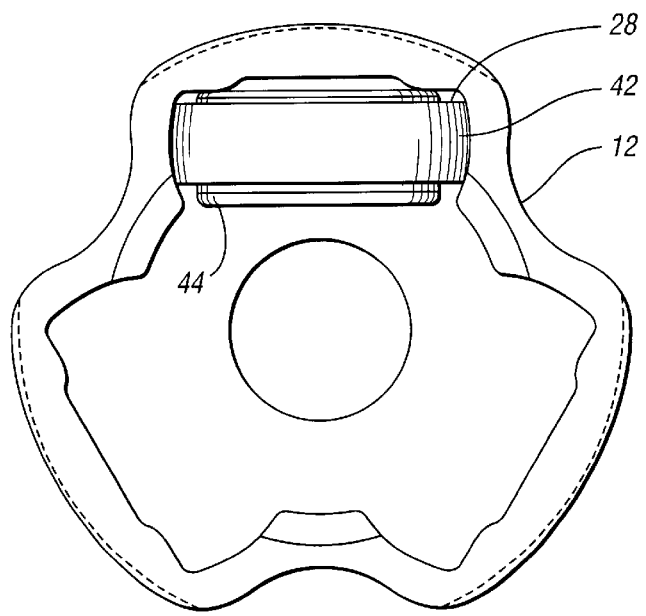
FIG. 9 is a cross-section of the outer joint member showing positioning of a roller bearing assembly with a track.

FIGS. 7–9 illustrate a roller bearing assembly 28 in accordance with the present invention. More specifically, the roller bearing assembly includes an outer ring 42 into which a holding ring 44 is pressed. A set of roller bodies 46, such as needle bearings, are positioned within an inner wall of the holding ring. An inner ring 48 supports the inner side of the roller bodies. As shown, the length 62 of the roller bodies are arranged to exceed the width 64 of the inner ring 48 as well as the width 66 of the outer ring 42.

Accordingly, the holding ring 44 is provided with a width of sufficient size to maintain the roller bodies between inner extending upper and lower flanges 50 and 52 on the holding ring. The circumferential flanges have different respective lengths. The shorter (upper) flange 50 exclusively serves for guiding the roller bodies and consequently has a length that is smaller than the diameter of the roller bodies. In contrast, the longer (lower) flange 52 overlaps the outer contour of the inner ring 48 to form an axial stop for the inner ring. Because the inner ring 48 has a significantly smaller width than outer ring 42, this design allows relatively large axial displacement between the inner ring 48 and the roller bodies, with the inner ring being supported on the roller bodies over its entire width independently of the fixed position of the outer ring within the track.

In further accordance with the present invention, inner ring 48 is moveable to allow the inner ring to stay properly positioned relative to the trunnion as the trunnion pivots therein. As best seen in FIG. 8, each roller bearing assembly 28 utilizes a concave, i.e., spherical shape, inner surface 54 on inner ring 48 to facilitate nesting with the outer spherical contour of the trunnion. The concave inner surface of inner ring 48 operates to evenly distribute the points of contact between the trunnion and the inner ring as the trunnion pivots within the roller bearing assembly. More specifically, the spherical-to-spherical contact surface area of the trunnion and inner surface of the inner ring operates to lower Hertzian stresses by distributing the force across a larger contact surface area than that of a spherical-to-cylindrical contact surface arrangement. This in turn advantageously lowers friction and potential shudder of the joint during operation of the vehicle.

The outer contour of the outer ring 42 is formed in the shape of a truncated sphere of substantially the same diameter as the spherical inner faces of the track walls so as to create a single, continuous region of contact between the two surfaces. The spherical-to-spherical contact surface of the outer ring and opposed inner faces of the track walls more evenly distributes the force to lower contact stresses experienced during operation of the joint. FIG. 9 shows a cross-section of the outer joint including positioning of a bearing assembly 28 within a track 16.

Figure 10:
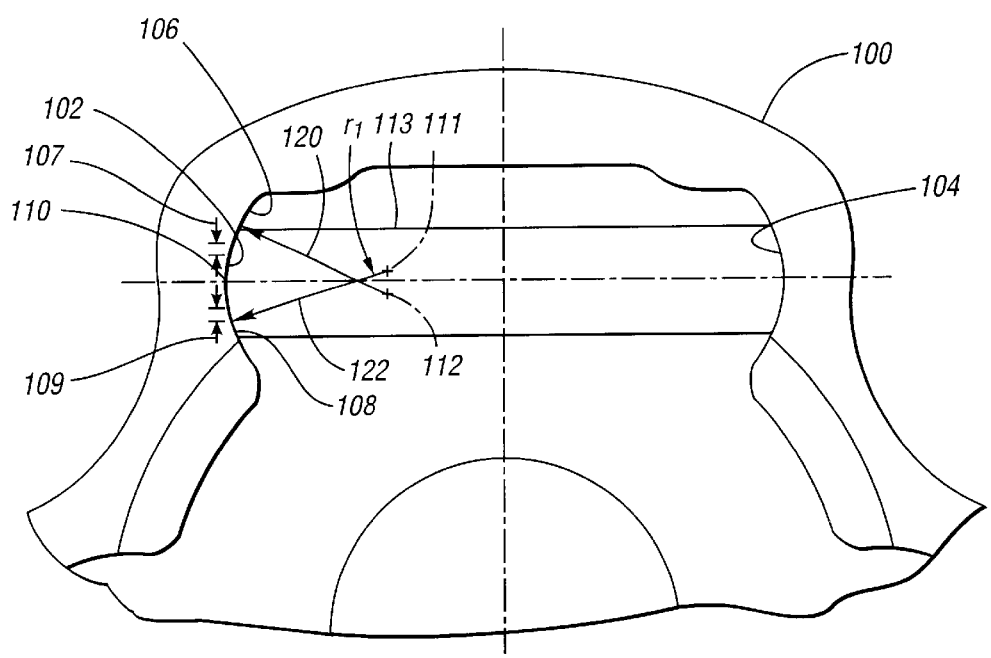
FIG. 10 is a partial cross-section of the out joint member showing the shape of a track in accordance with a second embodiment.
Figure 11:
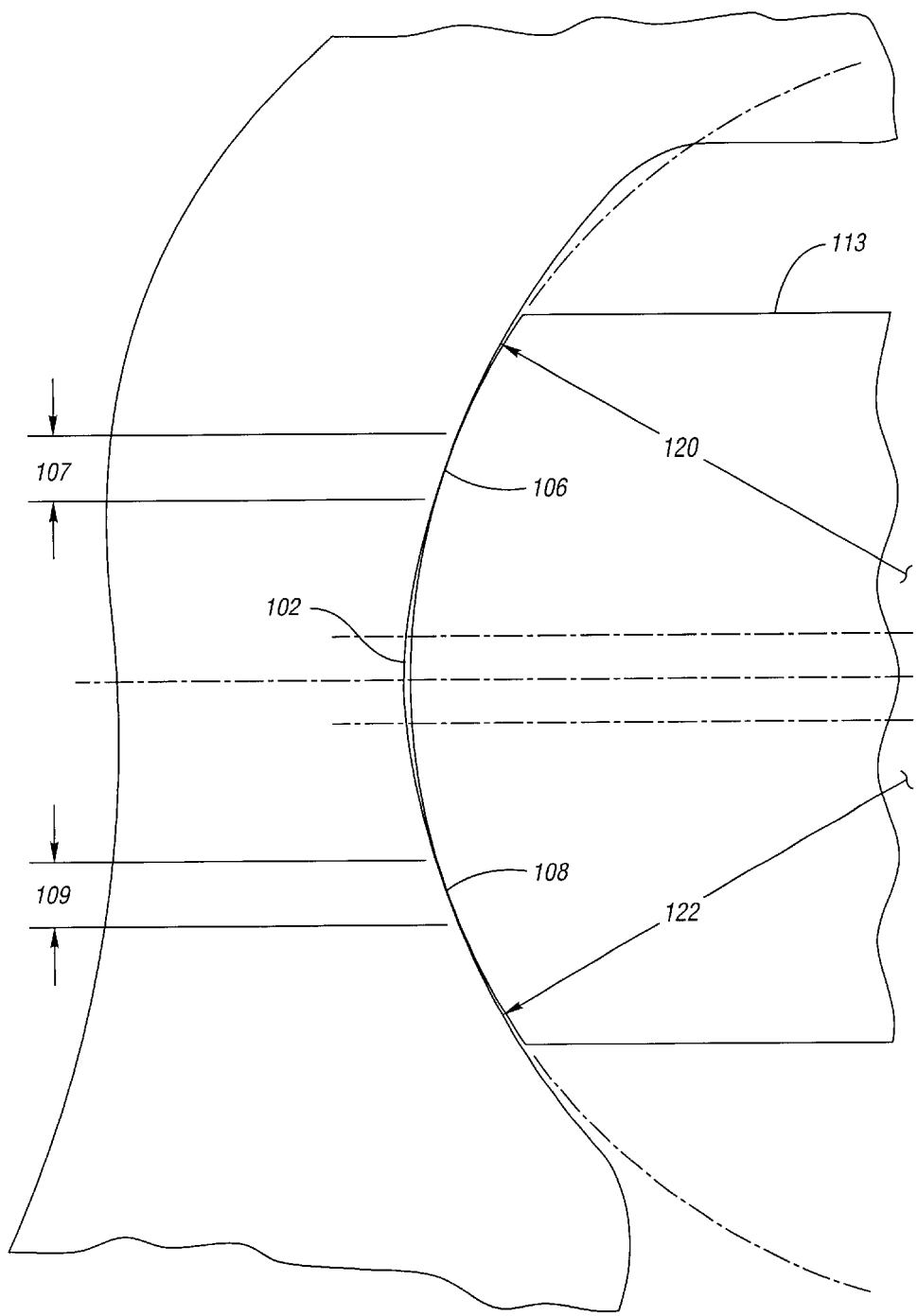
FIG. 11 his an enlarged view of a portion of FIG. 10 showing areas of contact and separation between the roller and the track.

Referring now to FIG. 10, an alternative embodiment of the present invention utilizes an outer part 100 having tracks with opposing inner faces 102 and 104 contoured to form a Gothic arch. The Gothic arch includes an upper curved portion 106 with a radius 120 at a center point 112, and a lower curved portion 108 having a radius 122 at a center point 111, the curved portions meeting at a center point 110. As shown in the preferred embodiment, the radii 120 and 122 may be the same radius as shown at r1. In addition in this embodiment, a roller bearing assembly includes an outer ring 113 having an outer surface shaped as a truncated ellipsoid with a radius different than r1. Such an arrangement causes the outer ring to contact the side walls of the tracks in two isolated regions, one region 107 on arch facing 106, and one region 109 on the other arch facing 108, as best shown in enlarged view FIG. 11.

In further accordance with the present invention, a roller bearing assembly 28 is mounted on a bearing support surface of the spider by aligning one side of the inner ring 48 with the outer surface of the bearing support surface at a specific angle, and then moving the opposing side of the inner ring over the bearing support surface until the smallest diameter portion of the inner ring slides over the largest diameter portion of the bearing support surface. In other words, when the inner ring is positioned at the specific angle, the opposing side will clear the outer radius of the trunnion allowing the entire ring to be slid over the trunnion. After the ring has been slid over the largest diameter portion of the trunnion, reorienting the bearing assembly so that the inner ring is no longer angled at the specific angle will cause the curvature of the inner ring to maintain the bearing assembly on the trunnion.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A constant velocity universal joint of a tripod type comprising:
    an outer joint member having three circumferentially distributed, axially extending longitudinal tracks formed therein;
    an inner joint member having three circumferentially distributed radial journals arranged to engage the longitudinal tracks, each journal having an outer spherical end surface;
    a roller member mounted about the outer end surface of each journal and arranged to contact opposing inner surfaces of a track, wherein each roller member includes an inner ring having a spherical inner surface arranged to nest about the outer spherical end surface of a journal so as to allow the journal to pivot therein and maintain the roller member in a parallel orientation relative to the track upon articulation of the joint;
    wherein the opposing sides of the longitudinal tracks are shaped as a Gothic arch, and each roller member includes a rotatable outer ring having an outer surface in the shape of an ellipsoid in a region of contact with the opposing sides of a track;
    wherein the outer end surface of each journal is flattened in opposing regions of the outer trunnion diameter so as to provide a grease channel; and
    wherein each of said flattened in opposing regions comprises adjacent, angularly aligned surfaces.

2. The constant velocity joint of claim 1 wherein the outer surface of the outer ring has a radius different than the radius of the arched track sides.

3. The constant velocity joint of claim 1 wherein the inner ring of the roller member is axially moveable with the journal as the journal pivots therein.

4. The constant velocity joint of claim 1 wherein the flattened portions of the outer end surface of each journal are positioned to facilitate placement of the roller member about the outer end surface.

5. The constant velocity joint of claim 1 wherein each track includes an outer end face having a raised middle portion to provide a grease channel for the track.

6. The constant velocity joint of claim 5 wherein the end face further includes shoulder surfaces on each side of the raised portion to support the top surface of the roller member and limit displacement of the roller member within the track.

7. The constant velocity joint of claim 1 wherein each roller member comprises:
    an outer ring;
    a holding ring positioned within the outer ring; and
    a set of roller bodies positioned within an inner wall of the holding ring, wherein the inner ring supports an inner side of the roller bodies, and the length of the roller bodies are arranged to exceed the width of the inner ring and the width of the outer ring.

8. The constant velocity joint of claim 7 wherein the holding ring comprises a first and a second inner extending flange arranged to maintain the roller bodies therebetween.

9. The constant velocity joint of claim 8 wherein one of the flanges extends inwardly farther than the other flange, the lesser extending flange providing a guide from the roller bodies, and the further extending flange overlapping the outer contour of the inner ring to form an axial stop for the inner ring.

10. The invention as described in claim 1 wherein said angularly aligned surfaces are inclined to divert lubrication to opposing sides of each journal.

11. A constant velocity universal joint of a tripod type comprising:
    an outer joint member having three circumferentially distributed, axially extending longitudinal tracks formed therein;
    an inner joint member having three circumferentially distributed radial journals arranged to engage the longitudinal tracks, each journal having an outer spherical end surface;
    a roller member mounted about the outer end surface of each journal and arranged to contact opposing inner surfaces of a track, wherein each roller member includes an inner ring having a spherical inner surface arranged to nest about the outer spherical end surface of a journal so as to allow the journal to pivot therein and maintain the roller member in a parallel orientation relative to the track upon articulation of the joint;
    wherein the opposing sides of the longitudinal tracks are shaped as a Gothic arch, and each roller member includes a rotatable outer ring having an outer surface in regions of contact with the opposing sides of a track;
    wherein the outer end surface of each journal is flattened in opposing regions of the outer trunnion diameter so as to provide a grease channel; and
    wherein each of said flattened in opposing regions comprises adjacent, angularly aligned surfaces.

* * * * *